US008581856B2

(12) United States Patent
Benko et al.

(10) Patent No.: US 8,581,856 B2
(45) Date of Patent: Nov. 12, 2013

(54) TOUCH SENSITIVE DISPLAY APPARATUS USING SENSOR INPUT

(75) Inventors: Hrvoje Benko, Seattle, WA (US);
Desney S. Tan, Kirkland, WA (US);
Daniel Morris, Bellevue, WA (US);
Timothy Scott Saponas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 506 days.

(21) Appl. No.: 12/472,446

(22) Filed: May 27, 2009

(65) Prior Publication Data
US 2010/0302137 A1 Dec. 2, 2010

(51) Int. Cl.
*G06F 3/041* (2006.01)

(52) U.S. Cl.
USPC ............... 345/173; 178/18.01; 178/19.01; 715/863

(58) Field of Classification Search
USPC ............... 178/18.01–19.07; 345/173–178; 715/863
See application file for complete search history.

(56) References Cited

U.S. PATENT DOCUMENTS

| | | | | |
|---|---|---|---|---|
| 6,720,984 | B1 * | 4/2004 | Jorgensen et al. | 715/863 |
| 7,030,861 | B1 | 4/2006 | Westerman et al. | |
| 7,362,305 | B2 * | 4/2008 | Alsio et al. | 345/156 |
| 7,453,444 | B2 | 11/2008 | Geaghan | |
| 7,519,223 | B2 | 4/2009 | Dehlin et al. | |
| 2006/0132432 | A1 * | 6/2006 | Bell | 345/156 |
| 2006/0183545 | A1 | 8/2006 | Jourdian et al. | |
| 2006/0202950 | A1 * | 9/2006 | Lee et al. | 345/156 |
| 2006/0227120 | A1 * | 10/2006 | Eikman | 345/175 |
| 2007/0078919 | A1 | 4/2007 | Westerman et al. | |
| 2008/0036743 | A1 | 2/2008 | Westerman et al. | |
| 2008/0084385 | A1 | 4/2008 | Ranta et al. | |
| 2008/0129694 | A1 | 6/2008 | Haven | |
| 2008/0165140 | A1 | 7/2008 | Christie et al. | |
| 2009/0051671 | A1 | 2/2009 | Konstas | |
| 2009/0133051 | A1 * | 5/2009 | Hildreth | 725/28 |

FOREIGN PATENT DOCUMENTS

WO WO 2008069577 A1 * 6/2008

OTHER PUBLICATIONS

Agarwal, et al."High Precision Multi-Touch Sensing on Surfaces using Overhead Cameras", Retrieved at<<http://ieeexplore.ieee.org/stamp/stamp.jsp?tp=&arnumber=4384130&isnumber=4384097>>, Second Annual IEEE International Workshop on Horizontal Interactive Human-Computer System, pp. 197-200, 2007.

(Continued)

*Primary Examiner* — Michael Pervan
(74) *Attorney, Agent, or Firm* — Medley, Behrens & Lewis, LLC

(57) ABSTRACT

Described herein is a system that includes a receiver component that receives gesture data from a sensor unit that is coupled to a body of a gloveless user, wherein the gesture data is indicative of a bodily gesture of the user, wherein the bodily gesture comprises movement pertaining to at least one limb of the gloveless user. The system further includes a location determiner component that determines location of the bodily gesture with respect to a touch-sensitive display apparatus. The system also includes a display component that causes the touch-sensitive display apparatus to display an image based at least in part upon the received gesture data and the determined location of the bodily gesture with respect to the touch-sensitive display apparatus.

20 Claims, 8 Drawing Sheets

(56) References Cited

OTHER PUBLICATIONS

Wilson Andrew D. "PlayAnywhere: A Compact Interactive Tabletop Projection-Vision System", Retrieved at<<http://research.microsoft.com/en-us/um/people/awilson/papers/Wilson%20PlayAnywhere%20UIST%202005.pdf>>, UIST'05, Oct. 23-27, 2005, Seattle, Washington, USA, pp. 10.

"Microsoft Surface", Retrieved at<<http://en.wikipedia.org/wiki/Microsoft_Surface>>, pp. 1-6, Apr. 22, 2009.

"DiamondTouch: A Multi-User Touch Technology", Retrieved at<<http://www.merl.com/papers/docs/TR2003-125.pdf>>, Oct. 2003.

Benko, et al. "Balloon Selection: A Multi-Finger Technique for Accurate Low-Fatigue 3D Selections", Retrieved at<<http://graphics.cs.columbia.edu/publications/benko3DUI07.pdf>>, IEEE Symposium on 3D User Interfaces Mar. 10-11, 2007, Charlotte, North Carolina, USA, pp. 79-86.

Wilson Andrew D. "Robust Vision-Based Detection of Pinching for One and Two-Handed Gesture Input", Retrieved at<<http://research.microsoft.com/en-us/um/people/awilson/papers/UIST%202006%20TAFFI.pdf>>, UIST'06, Oct. 15-18, 2006, Montreux, Switzerland, pp. 4.

Benko, et al. "DepthTouch: Using Depth-Sensing Camera to Enable Freehand Interactions on and above the Interactive Surface", Retrieved at<<http://research.microsoft.com/pubs/79848/DepthTouch_TR_final.pdf>>, Mar. 2009, IEEE Work-shop on Tabletops and Interactive Surfaces '08. Amsterdam, the Netherlands, Oct. 1-3, 2008, pp. 8.

* cited by examiner

TOUCH SENSITIVE DISPLAY APPARATUS USING SENSOR INPUT

BACKGROUND

Technology pertaining to touch sensitive display apparatuses has advanced in recent years such that touch sensitive display apparatuses can be found in many consumer level devices and applications. For example, automated teller machines (ATMs) often include touch sensitive display apparatuses that allow users to select an amount for withdrawal or deposit when the user touches a certain portion of the screen. In another example, many conventional personal digital assistants include touch sensitive display apparatuses that allow users to select graphical icons and interact with the personal digital assistant in a way that many novice users find to be intuitive. In still other examples, touch sensitive display apparatuses can be found in point of sale terminals, laptop computers, cellular telephones and other devices that are commonplace.

The popularity of touch sensitive display apparatuses has increased due at least in part to ease of use, particularly for novice computer users. For instance, novice computer users may find selection of a graphical icon by hand more intuitive than selection of the icon through use of various menus and/or a pointing and clicking mechanism such as a mouse. In conventional touch sensitive display apparatuses users can select, move, modify or perform other tasks on graphical objects that are visible on the touch sensitive display apparatus by selecting such objects with a finger and/or stylus.

More advanced touch sensitive display apparatuses are equipped with multi-touch functionality. That is, a multi-touch display apparatus can recognize that two members (e.g., fingers) are simultaneously in contact therewith. A computing process may then be performed based at least in part upon the simultaneous touching of the touch sensitive display apparatus with the multiple members. In an example, a user may select a first corner of a graphical icon with a first finger and select a second corner of the graphical icon with a second finger and, by moving the fingers in opposite directions, cause the graphical object to be expanded on the touch sensitive display apparatus.

While multi-touch functionality has expanded the input vocabulary (e.g., possible commands) that can be used in connection with interacting with a touch sensitive display apparatus, the vocabulary for interacting with touch sensitive display apparatuses remains relatively limited. In other words, application designers are currently limited in designing applications for use in touch sensitive display apparatuses by the relatively limited manners in which a user can interact with a conventional touch sensitive display apparatus.

SUMMARY

The following is a brief summary of subject matter that is described in greater detail herein. This summary is not intended to be limiting as to the scope of the claims.

Described herein are various technologies pertaining to touch sensitive display apparatuses in general and, more particularly, to using input from a sensor attached to the body of a user in connection with the touch sensitive display apparatus. Pursuant to an example, a user can place a sensor on a portion of their body such as on a wrist, a forearm, around a neck, around a bicep, etc. For instance, the sensor may be or include at least one electromyography sensor. In another example, the sensor may be a sensor that is configured to detect muscular movement pertaining to a limb or finger of the user by way of a technology other than electromyography.

The sensor coupled to the body of the user can be configured to output data indicative of a gesture being undertaken by the user, wherein a gesture can be particular movement of at least one finger, movement pertaining to a limb of the user (such as rotating an arm or moving an arm), movement pertaining to multiple fingers of the user, etc. Still further, data output from the sensor can be indicative of identities of one or more fingers or hands of the user. Thus, in an example, the sensor may be a portion of a sensor unit that is attached to the forearm of the user. The sensor can output data that indicates an index finger of the user has been moved in a particular manner. Therefore, data output by the sensor can be indicative of hand identity, finger identity and type of gesture being undertaken by the user.

Responsive to receipt of data output by at least one sensor coupled to the body of the user, a location of a gesture performed by the user can be determined with respect to a touch sensitive display apparatus. For example, the user may touch the touch sensitive display apparatus with the pointer finger of the right hand of the user at a particular position on the touch sensitive display apparatus. Once the user has touched the touch sensitive display apparatus, determination of the location of such touch can be undertaken. In another example, location of a gesture can be determined in a hoverspace above the touch sensitive display apparatus. This can be accomplished, for example, by emitting infrared light through a diffuse surface of the touch sensitive display apparatus and capturing light reflected from the fingers or hands of the user, wherein such fingers or hands are positioned in the hoverspace above the touch sensitive display apparatus. Other manners for determining location of gestures undertaken by the user are also contemplated.

Responsive to receipt of data from the sensor and responsive to determining location of a gesture with respect to the touch sensitive display apparatus, a computing process can be performed at the touch sensitive display apparatus. For instance, the computing process can include displaying certain graphical items to the user or causing graphical items to be modified.

Other aspects will be appreciated upon reading and understanding the attached figures and description.

DETAILED DESCRIPTION

Figure 1:
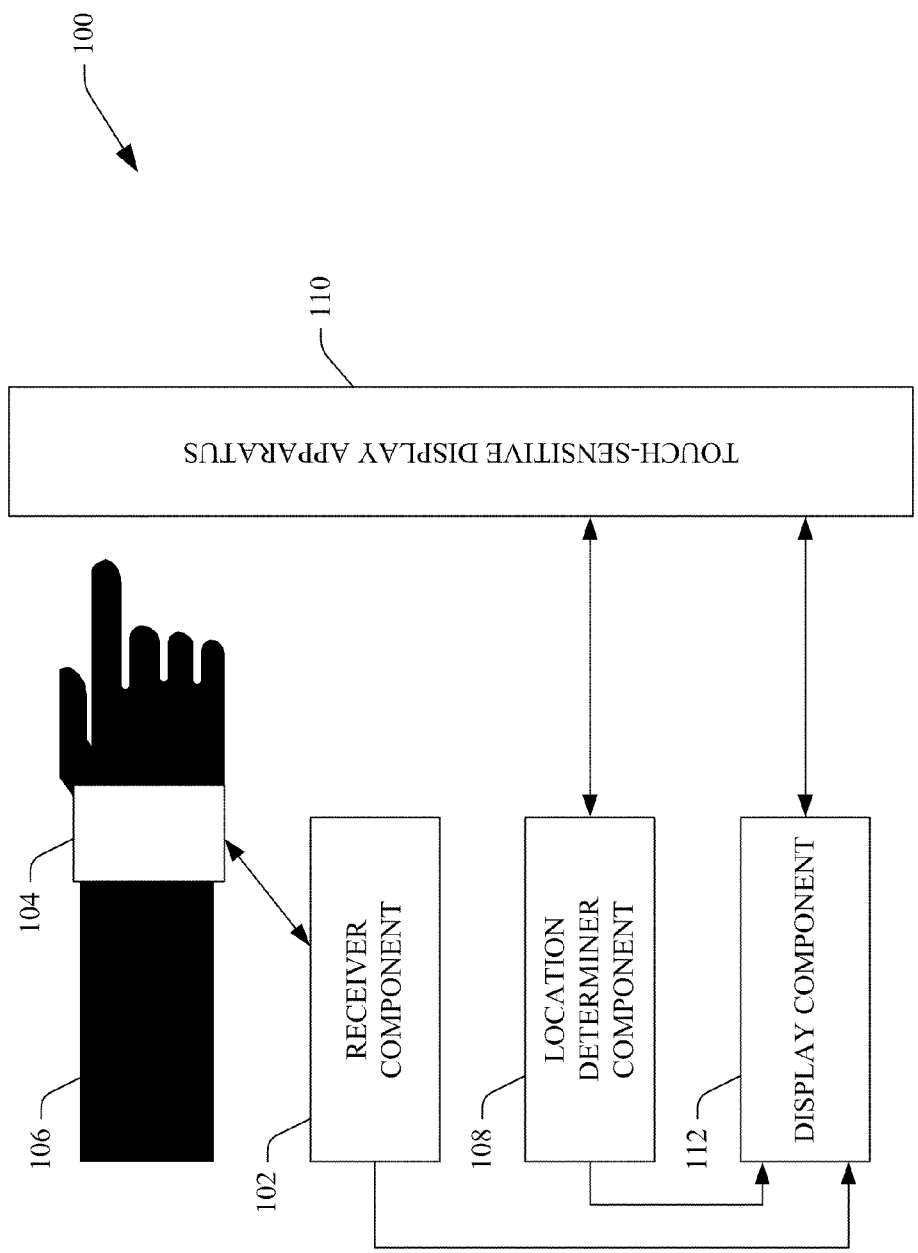
FIG. 1 is a functional block diagram of an example system that facilitates executing a process on a touch sensitive display apparatus based at least in part upon sensor data output from a sensor attached to a body of a user.

Various technologies pertaining to touch sensitive display apparatuses and sensors that are configured to detect gestures will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates performing a computing process on a touch sensitive display apparatus is illustrated. The system 100 includes a receiver component 102 that is configured to receive gesture data from a sensor unit 104 that is coupled to a body of a gloveless user 106. Gesture data output by the sensor unit 104 can be indicative of a bodily gesture of the gloveless user 106. As used herein, a bodily gesture can refer to movement pertaining to at least one limb of the gloveless user. In another example, a bodily gesture can comprise movement of at least one finger of the gloveless user 106. Thus, for example, as used herein a gesture may be a movement of an arm of the gloveless user 106 in a particular direction. In another example, a gesture may be movement of a particular finger such as tapping of a pointer finger. In yet another example, a gesture may be movement of a limb and at least one finger at a substantially similar point in time. In still yet another example, a gesture may be movement of two fingers at a substantially similar point in time, positioning of two fingers at certain location(s) at a substantially similar point in time, etc. For instance, a gesture may be pressing a pointer finger against a thumb, may be separating a pointer finger from a middle finger or any other suitable movement or position of fingers. Types of sensors that can be included in the sensor unit 104 that can facilitate outputting gesture data will be described in greater detail below.

The system 100 may further include a location determiner component 108 that can be configured to determine location of the bodily gesture with respect to a touch sensitive display apparatus 110. For example, the location determiner component 108 may be in communication with, or part of, the touch sensitive display apparatus 110. In other words, the touch sensitive display apparatus 110 can use any suitable technology/technique in connection with determining location of a touch on the touch sensitive display apparatus 110. Furthermore, the location determiner component 108 can be configured to determine location of a gesture as it occurs in a hoverspace above the touch sensitive display apparatus 110. For instance, the touch sensitive display apparatus 110 may have a diffuse surface and nonvisible light, such as infrared light, can be emitted through the surface of the touch sensitive display apparatus 110. Such nonvisible light may then reflect from a finger, the hand, etc. of the gloveless user 106 back through the diffuse display surface of the touch sensitive display apparatus 110. Other techniques for determining locations of a gesture (e.g., a location of a finger, etc.) are contemplated and intended to fall under the scope of the hereto-appended claims.

The system 100 may further include a display component 112 which can be in communication with the receiver component 102 and the location determiner component 108. The display component 112 can receive gesture data received by the receiver component 102 and a location determined by the location determiner component 108 and can cause the touch sensitive display apparatus 110 to display an image on a display surface based at least in part upon the received gesture data and the determined location of the bodily gesture with respect to the touch sensitive display apparatus 110. For example, the display component 112 can cause an image to be presented to the user responsive to receipt of the gesture data and determined location of the gesture. Such image may pertain to an application executing on the touch sensitive display apparatus 110 (e.g., initializing an application, interacting with an application, etc.).

As can be ascertained, the gesture data output by the sensor unit 104 allows for additional vocabulary to be used in connection with interacting with the touch sensitive display apparatus 110. For example, gesture data output by the sensor unit 104 can indicate that an index finger is being used to touch the touch sensitive display apparatus 110. Touching the touch sensitive display apparatus 110 with an index finger may be associated with a different command when compared to touching the touch sensitive display apparatus with a pointer finger.

Furthermore, gesture data output by the sensor unit 104 can indicate which user is interacting with the touch sensitive display apparatus 110. For example, the sensor unit 104 can be configured to output data that identifies the sensor unit 204, and therefore can identity a user that is wearing the sensor unit 104. In yet another example, the gesture data output by the sensor unit 104 can indicate which hand is being used to interact with the touch sensitive display apparatus 110 (e.g., during initial use of the sensor unit 104, the user can indicate that the sensor unit 104 is being worn on a certain arm). In still yet another example, the sensor unit 104 can output gesture data to indicate that multiple fingers are being employed by the gloveless user 106 to interact with the touch sensitive display apparatus 110. The display component 112 can be configured to recognize a plurality of different types of gestures and can take into consideration identities of fingers, hands and/or users that are performing the gestures in connection with displaying an image on the touch sensitive display apparatus 110.

With respect to the sensor unit 104, such sensor unit 104 may be in any suitable form that allows the gloveless user 106 to natively interact with the touch sensitive display apparatus 110. For instance, the sensor unit 104 may be in the form of a wristband or included as a portion of a wristwatch. In another example, the sensor unit 104 may be in the form of a forearm band, a bicep band, may be placed on eyeglasses, may be in the form of a necklace, etc.

Furthermore, in an example, the sensor unit 104 may include at least one electromyography sensor. Electromyography is a sensing technology that measures electrical potentials generated by activity of muscle cells in the human body. Specific muscle activity can be monitored through use of an electromyography sensor and used to infer movements (intended or otherwise). Specifically human skeletal muscles are made up of muscle fibers attached to bone by tendons. To contract a muscle, the brain sends an electrical signal to the nervous system to motor neurons. Motor neurons in turn transmit electrical impulses to adjoining muscle fibers causing the muscle fibers to contract. Many motor neurons and their muscle fibers make up a muscle. During muscle contraction, some subset of these neurons and their muscle fibers are activated and the sum of electrical activity can be measured with an electromyography sensor. For instance, an electromyography sensor can measure muscular electrical signals from the surface of the skin. As noted above, gesture data output by the sensor unit 104 can be indicative of a bodily gesture undertaken by the user. Recognizing particular gestures through utilization of electromyography technologies is described in U.S. patent application Ser. No. 12/146,471, filed Jun. 26, 2008, and entitled "RECOGNIZING GESTURES FROM FOREARM EMG SIGNALS," the entirety of which is incorporated herein by reference.

Additionally, the sensor unit 104 may comprise multiple electromyography sensors. Such sensors in the sensor unit 104 may be calibrated by causing electrical pulses to be transmitted from electrodes in the sensor unit 104, wherein such electrical pulses can be sensed by sensors in the sensing unit 104. Calibrating electromyography sensors in a sensor unit as well as multiplexing data from electromyography sensors in the sensor unit 104 is described in application Ser. No. 12/404,223, filed Mar. 13, 2009, and entitled "WEARABLE ELECTROMYOGRAPHY-BASED CONTROLLERS FOR HUMAN-COMPUTER INTERFACE," the entirety of which is incorporated herein by reference.

In another example, the sensor unit 104 may include one or more sensors that are configured to measure muscle displacement in a forearm, on a hand, etc. For instance, rather than sensing electrical signals output by muscles during certain muscle activity, the sensor unit 104 may include one or more sensors that are configured to detect physical displacement of one or more muscles/tendons on the gloveless user 106. For instance, the sensor unit 104 may include one or more piezoelectric sensors that are configured to output an electrical signal upon distortion of piezoelectric material in the piezoelectric sensors. A signal output by a piezoelectric sensor can be indicative of a gesture being undertaken by the gloveless user 106. Of course, other sensor technologies that can be configured to output data responsive to muscle movement/ electrical activity in the human body are contemplated and intended to fall into the scope of the hereto appended claims.

The sensor unit 104 may be equipped with a communications interface that facilitates transmission and receipt of data to and from a computing device, such as the touch sensitive display apparatus 110. For instance, the sensor unit 104 may be equipped with a wireless transmitter that transmits data in accordance with 802.11 specifications. In another example, the sensor unit 104 may be equipped with an infrared transmitter that facilitates transmission and receipt of data by way of infrared signals. In still another example, the sensor unit 104 can be connected via a wireline connection to a computing device such as the touch sensitive display apparatus 110. Additionally or alternatively, the sensor unit 104 may be configured to include a processor, such that data output by one or more sensors in the sensor unit 104 may be processed in the sensor unit 104.

Additionally, the sensor unit 104 may be powered by any suitable power source. For example, the sensor unit 104 may include a repository that facilitates receipt of a battery that can provide power to sensors in the sensor unit 104 and a transmission device in the sensor unit 104. In another example, the sensor unit 104 may be equipped with fuel cell technology, one or more solar cells or other suitable technology that can be employed in connection with providing power to one or more sensors and a data transmission/reception device in the sensor unit 104.

The sensor unit 104 may also be equipped with modules that allow tactile response to be provided to the gloveless user 106. For instance, the sensor unit 104 may be equipped with modules that vibrate in response to receipt of a command from the receiver component 102. If the receiver component 102 does not recognize a gesture, the receiver component 102 can cause a module in the sensor unit 104 to vibrate, thereby providing information to the user that the user should re-perform the gesture. In another example, an application executing on the touch sensitive display apparatus 110 can be configured to cause a module to provide tactile responses to the gloveless user 106 by way of the sensor unit 104. For instance, the gloveless user 106 may be participating in a computer video game that is executing on the touch sensitive display apparatus 110, and a portion of such game may desirably cause the sensor unit 104 to provide tactile responses to the gloveless user 106.

In addition, while FIG. 1 depicts the gloveless user 106 wearing a single sensor unit, it is to be understood that multiple sensor units may be coupled to the gloveless user 106. For example, a sensor unit may be placed on each arm of the gloveless user 106 such that the gloveless user 106 can interact with the touch sensitive display apparatus 110 with gestures using both hands/arms. In another example, multiple sensor units can be placed on a single limb of the gloveless user 104. Thus, the gloveless user 106 may wear a first sensor unit in the form of a shoulder strap, may wear a second sensor unit in the form of a forearm band, and may wear third sensor unit in the form of a wristband or wristwatch. Gesture data output by the series of sensor units may provide granular information pertaining to gestures undertaken by the user.

With respect to the touch sensitive display apparatus 110, such apparatus 110 may be or include any suitable touch sensitive technologies. For example, the touch sensitive display apparatus 110 may include a resistive surface, a capacitive surface, may include one or more cameras that can recognize when a member is in physical contact or hovering above the touch sensitive display apparatus 110, may include infrared technologies or any other suitable technologies that may be used in connection with touch sensitive displays.

With respect to the display component 112, various interactive applications can be used in connection with the sensor unit 104. For example, the display component 112 can combine high resolution and/or special gestures such as pointing and selecting objects on the surface of the touch sensitive display apparatus 110 with lower resolution gestures. For instance, the gloveless user 106 may be participating in a computer video game using the touch sensitive display apparatus 110, where a first portion of the game can be played by directly contacting the surface of the touch sensitive display apparatus 110 and a second portion of the game may be played by stepping away from the touch sensitive display apparatus 110 and using gestures sensed by way of the sensor unit 104. In another example, discrete actions such as turn on and off lights, etc. may be performed by directly contacting the touch sensitive display apparatus 110, while executing such actions may be initiated by way of a gesture recognized using the sensor unit 104. In still yet another example, the touch sensitive display apparatus 110 may be executing presentation software (e.g., software that facilitates presenting data/images to a plurality of people). An object on the surface can be selected by the gloveless user 106 by touching the surface of the touch sensitive display apparatus 110 while other actions such as rotating and scaling images can be executed based upon data output by the sensor unit 104 when the gloveless user 106 is standing away from the touch-sensitive display apparatus 110. These applications are but a mere few examples of the possible applications that can employ a combination of data output by the sensor unit 104 and capabilities of touch sensitive display apparatuses.

Figure 2:
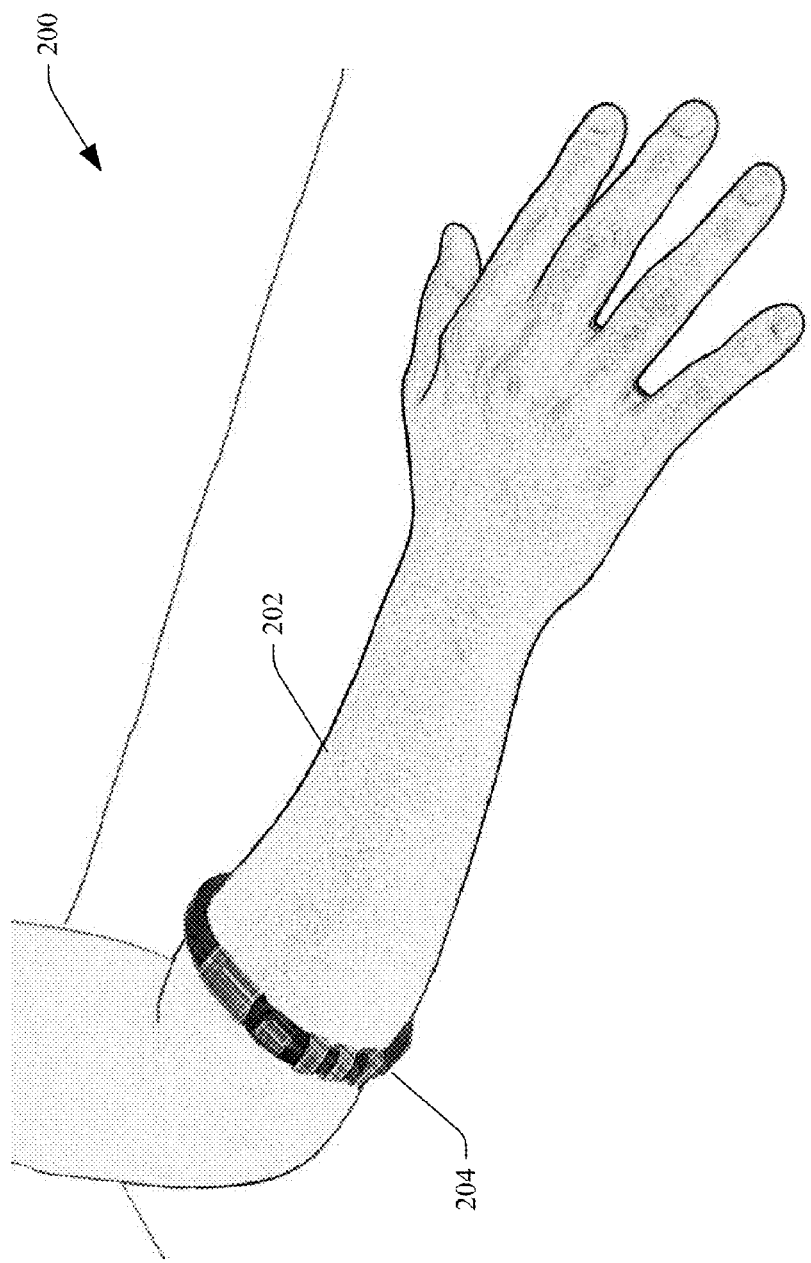
FIG. 2 illustrates an example sensor apparatus coupled to a forearm of a user.

Referring now to FIG. 2, an example depiction 200 of a sensor unit that employs electromyography technologies is illustrated. The depiction 200 includes an arm 202 of a gloveless user. A sensor unit 204 is placed directly on the skin of the gloveless user 202. In an example, the sensor unit 204 may be an elastic band that is configured to closely couple sensors in the sensor unit 204 with skin of the gloveless user 202. Sensor in the sensor unit 204 may be uniformly placed on the inside of such sensor unit 204. While shown as being positioned on the forearm of the gloveless user 202, it is to be understood that the sensor unit 204 may be placed at other positions on the body of the gloveless user 202. Furthermore, it is to be noted that the gloveless user 202 can interact in a native and unoccluded manner with a touch sensitive display apparatus or other entities as the user 202 does not have sensors coupled to the fingers of such user.

Figure 3:
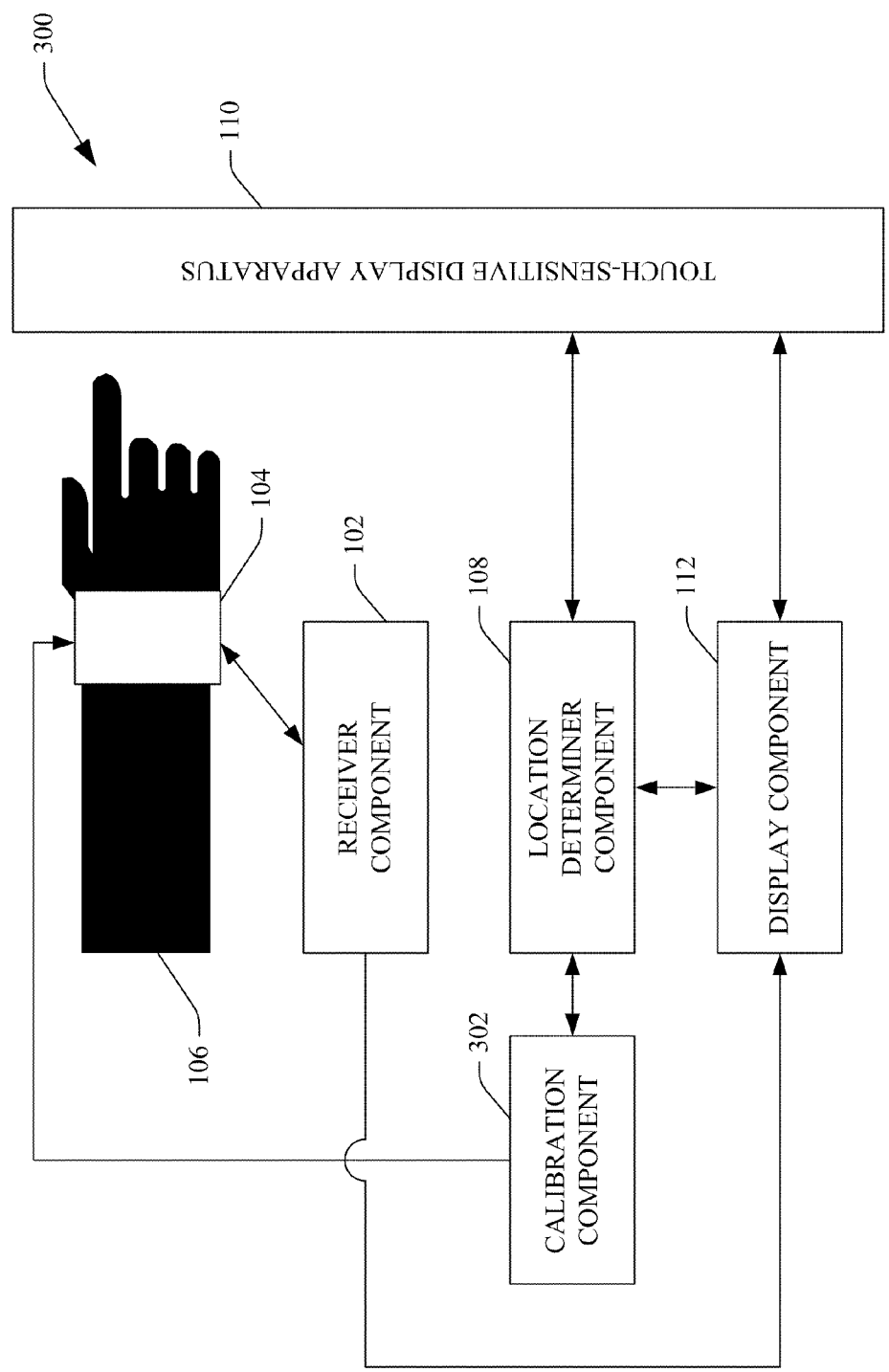
FIG. 3 is a functional block diagram of an example system that facilitates calibrating a sensor unit and/or a touch sensitive display apparatus.

Turning now to FIG. 3, an example system 300 that facilitates calibrating a sensor unit and/or a touch sensitive display apparatus 110 is illustrated. The system 300 includes the receiver component 102 that receives gesture data from the sensor unit 104 that is coupled to the skin of the gloveless user 106. The location determiner component 108 determines location of a gesture that is detected through use of the sensor unit 104 with respect to the touch sensitive display apparatus 110. The display component 112 is in communication with the receiver component 102 and the location determiner component 108 and displays an image based at least in part upon the gesture data received from the receiver component 102 and a location of the gesture as determined by the location determiner component 108. As noted above, the display component 112 can disambiguate between fingers of the gloveless user 106 used in a gesture, may disambiguate between users that are wearing sensor units, may disambiguate between hands of a user, etc. in connection with displaying an image on the touch sensitive display apparatus 110.

The system 300 further includes a calibration component 302 that can be used in connection with calibrating the sensor unit 104 with respect to the touch sensitive display apparatus 110 and/or calibrating the touch sensitive display apparatus 110 with respect to the sensor unit 104. For example, the calibration component 302 may cause the touch sensitive display apparatus 110 to display graphical icons and/or instructions that inform the gloveless user 106 of certain gestures to make with respect to the touch sensitive display apparatus 110 at particular locations. Thus, for instance, the calibration component 302 can cause an icon to appear on the touch sensitive display apparatus 110 and instructions that request that the gloveless user 106 touch the displayed icon with a pointer finger of the gloveless user's right hand. Thereafter, the display component 112 can have some data pertaining to what constitutes a touch of the touch sensitive display apparatus 110 with the pointer finger of the right hand of the gloveless user 106.

In another example, the touch sensitive display apparatus 110 may include algorithm/functionality that is used to approximate multi-finger gestures, used to approximate pressure applied to the touch sensitive display apparatus 110, etc. Data output from the sensor unit 104 may be used in connection with calibrating such approximations. Therefore, data output from the sensor unit 104 may be used by the touch sensitive display apparatus 110 even when the gloveless user 106 or another user is not wearing the sensor unit 104.

Figure 4:
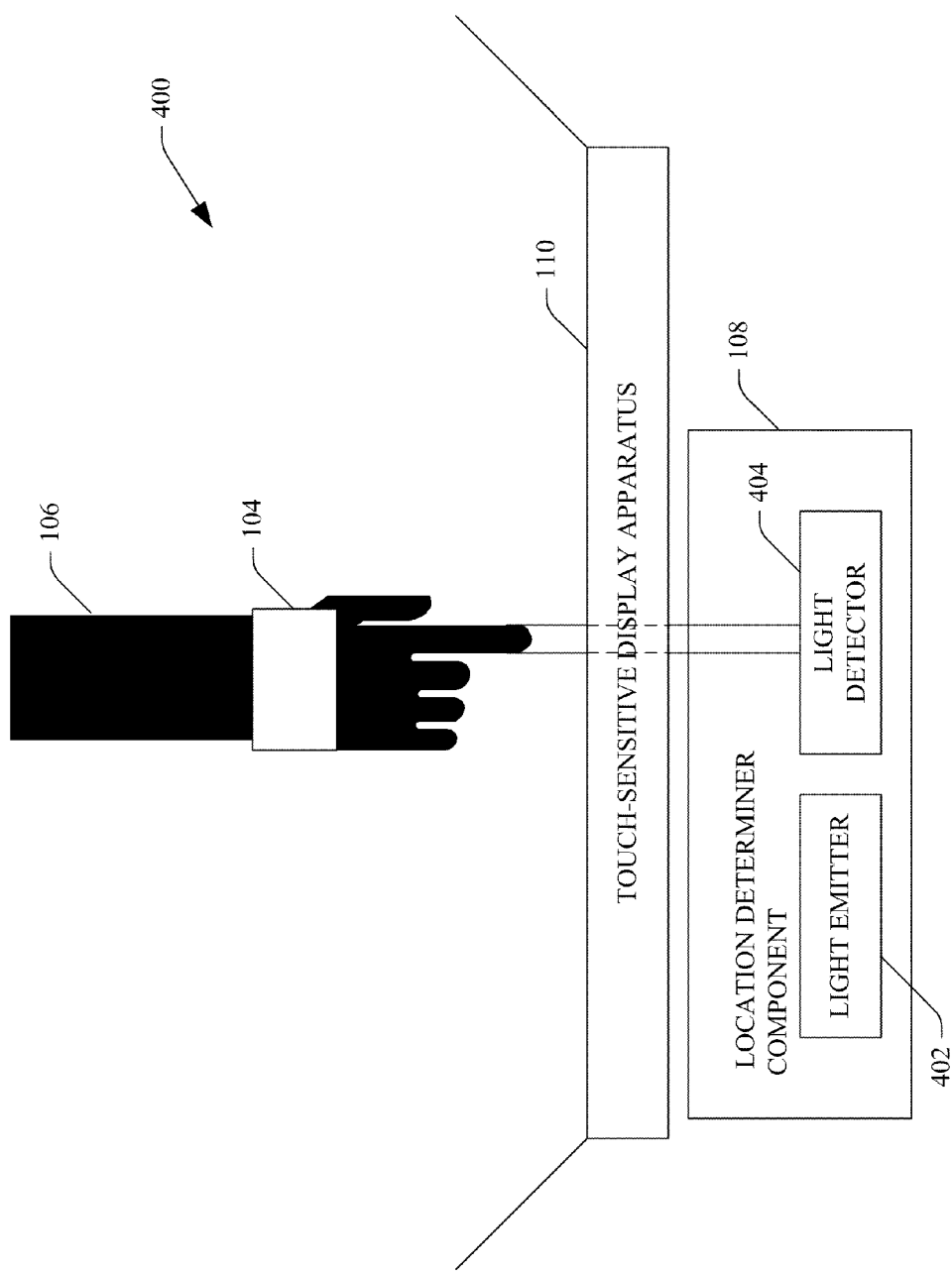
FIG. 4 is a functional block diagram of an example system that facilitates determining location of a gesture of a user when the gesture is in a hoverspace above a touch sensitive display apparatus.

Turning now to FIG. 4, an example system 400 that facilitates detecting location of a gesture with respect to a touch sensitive display apparatus when the gesture occurs in a hoverspace of the touch sensitive display apparatus is illustrated. The system 400 includes the touch sensitive display apparatus 110, wherein the gloveless user 106 is performing a gesture in the hoverspace of the touch sensitive display apparatus 110. As can be ascertained, the sensor unit 104 is coupled to the skin of the gloveless user 106.

The system 400 further includes a light emitter 402 that can, for example, emit nonvisible light through a diffuse display surface of the touch sensitive display apparatus 110. For example, the location determiner component 108 may comprise the light emitter 402. A light detector 404 can detect nonvisible light that reflects from a finger, hand, etc. of the gloveless user 106. The location determiner component 108 can process the reflective light in connection with determining where, with respect to the touch sensitive display apparatus 110, the gloveless user's hand/finger is located, thereby ascertaining where (with respect to the touch sensitive display apparatus 110) a gesture is performed.

While the light emitter 402 has been described as emitting nonvisible light, it is to be understood that other technologies may be used in connection with detecting location of a gesture in a hoverspace of the touch sensitive display apparatus 110. For example, a camera may be positioned in the touch sensitive display apparatus 110 and pixels of images captured by such camera can be analyzed to determine where, with respect to the touch sensitive display apparatus 110, a gesture is being performed. In other words, depth values can be assigned to pixels in captured images, and such depth values can be used in connection with determining where a gesture is being performed. In another example, techniques such as ultrasound can be used in connection with determining where the gloveless user 106 is undertaking a gesture with respect to the touch sensitive display apparatus 110. Such location information can be used together with gesture data output by the sensor unit 104 to display an image to the gloveless user 106 on the touch sensitive display apparatus 110 (e.g., such location data may be used in connection with allowing the gloveless user 106 to interact in an intuitive manner with the touch sensitive display apparatus 110).

Figure 5:
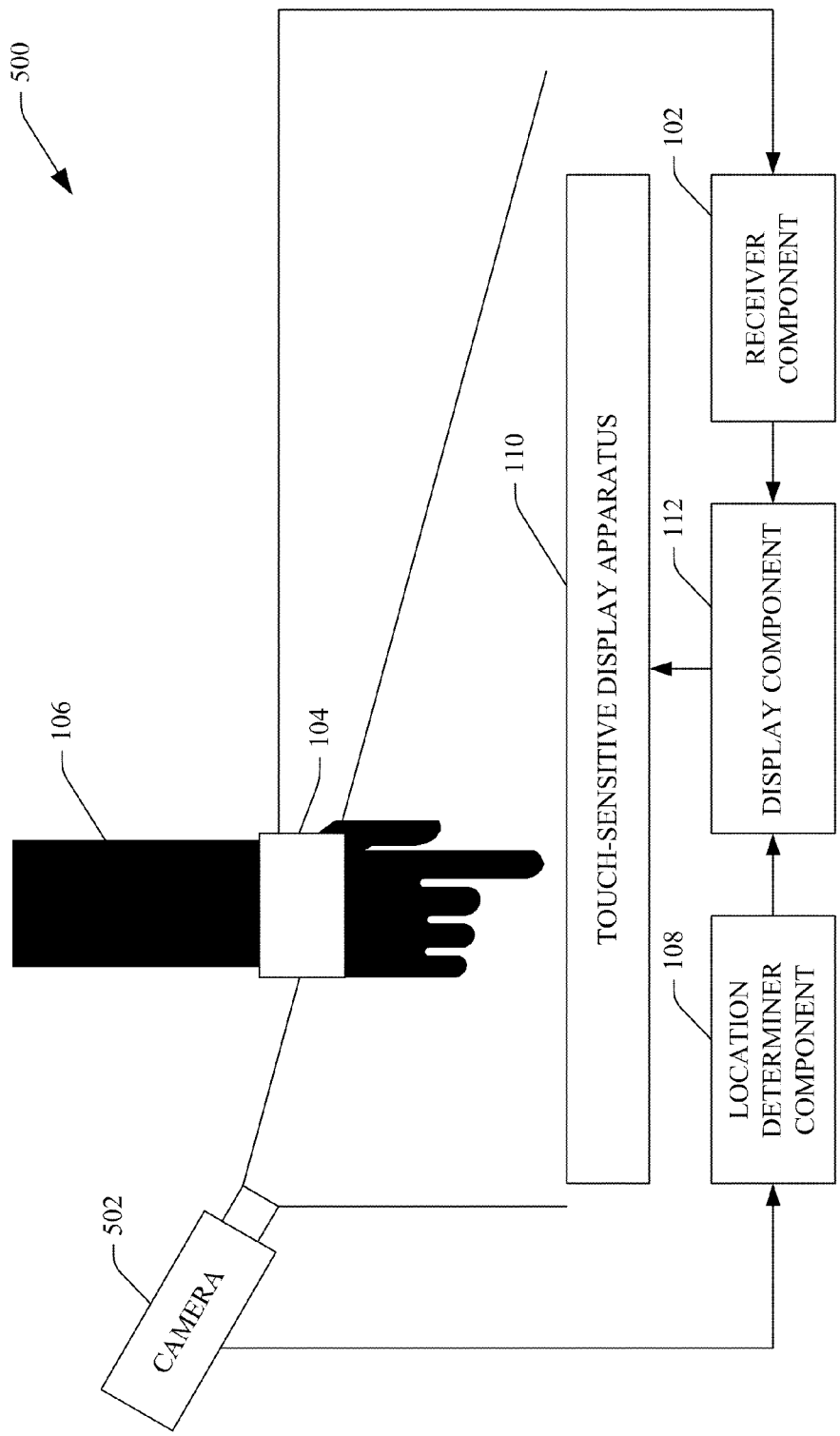
FIG. 5 is a functional block diagram of an example system that facilitates determining location of a gesture undertaken by a user in a hoverspace above a touch sensitive display apparatus.

Turning now to FIG. 5, another example system 500 that can be used in connection with determining location of a gesture in a hoverspace over a touch sensitive display apparatus as illustrated. The system 500 includes the receiver component 102 that receives gesture data from the sensor unit 104 being worn by the gloveless user 106.

The system 500 may additionally include a camera 502 that is external to the touch sensitive display apparatus 110, wherein field of view of the camera 502 is configured to encompass a hoverspace of the touch sensitive display apparatus 110. The location determiner component 108 can analyze images captured by the camera 502 in connection with determining location of a gesture being performed by the gloveless user 106 with respect to the touch sensitive display apparatus 110. Image analysis techniques are well known and for the sake of brevity are not described herein. However, it is to be understood that the location determiner component 108 may use any suitable image analysis technique in connection with determining/estimating a location of a gesture undertaken by the gloveless user 106 as such gesture is performed in the hover space of the touch sensitive display apparatus 110. As described above, the display component 110 can cause image data to be displayed on the touch sensitive display apparatus 110 based at least in part upon the location determined by the location determiner component 108 and gesture data received by the receiver component 102.

Figure 6:
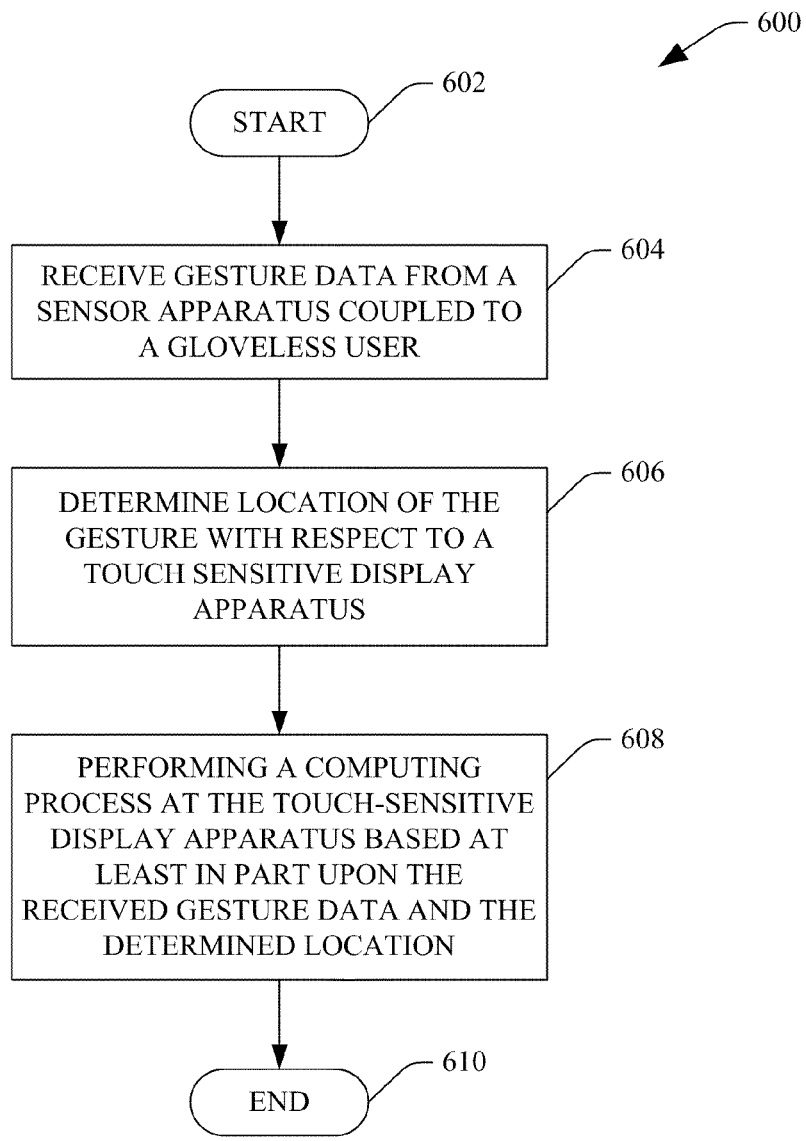
FIG. 6 is a flow diagram that illustrates an example methodology for performing a computing process at a touch sensitive display apparatus based at least in part upon gesture data received from a sensor attached to a human body and a determined location of such gesture.
Figure 7:
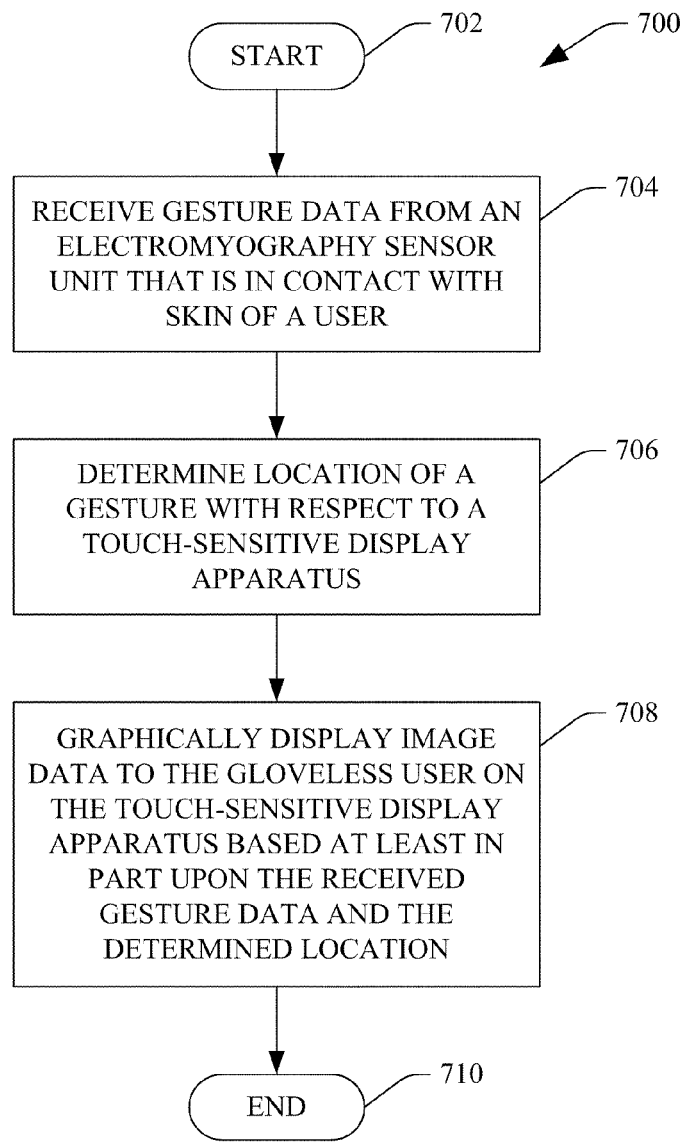
FIG. 7 is a flow diagram that illustrates an example methodology for graphically displaying image data to a gloveless user on a touch sensitive display apparatus.

With reference now to FIGS. 6 and 7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates performing a computing process based at least in part upon gesture data output from a sensor unit coupled to a user that is indicative of a gesture performed by the user and location of such gesture with respect to a touch sensitive display apparatus is illustrated. The methodology 600 begins at 602, and at 604 gesture data is received from a sensor apparatus that is coupled to a gloveless user. Pursuant to an example, the gesture data can be indicative of a gesture undertaken by the gloveless user, such as movement of at least one finger of the gloveless user. Moreover, the gesture data include data that is indicative of an identity of the gloveless user, which digit or digits of the gloveless user are included in the gesture, an amount of pressure applied to a touch sensitive display apparatus by at least one finger of the gloveless user, an identity of a hand being used to perform the gesture, etc. The gesture data may also include data that has been provided in examples given above. The sensor apparatus may include at least one electromyography sensor and may be of any suitable form, such as a wristband, a band for placement on a forearm, a device for coupling to a human shoulder, a necklace, etc.

Furthermore, as used herein, the gesture data received at 604 may indicate that a first finger and a second finger of the gloveless user are substantially simultaneously performing gestures with respect to a touch sensitive display apparatus. The gesture data may also include data that identifies the first finger and that identifies a second finger. In still yet another example, gesture data received at 604 may indicate that a first user and a second user are substantially simultaneously performing one or more gestures with respect to a touch sensitive display apparatus, and the gesture data may further include data that disambiguates between the first user and the second user (or additional users).

At 606, location of the gesture with respect to a touch sensitive display apparatus is determined. For example, determining the location of the gesture with respect to the touch sensitive display apparatus may be based upon or include determining where on the touch sensitive display apparatus that at least one finger of the gloveless user is in physical contact with the touch sensitive display apparatus. In another example, determining location of the gesture with respect to the touch sensitive display apparatus may include determining that the gesture is performed in a hoverspace above the touch sensitive display apparatus and further may include determining where in the hoverspace such gesture is being performed.

At 608, a computing process is performed at the touch sensitive display apparatus based at least in part upon the gesture data received at 604 and the location determined at 606. For example, the computing process may include disambiguating between two fingers of a user, disambiguating between hands of a user, disambiguating between users, etc. The computing process may also include executing a particular process based at least in part upon whether or not the gesture occurs in a hoverspace of the touch sensitive display apparatus. Still further, performing the computing process may include modifying graphical data displayed on the touch sensitive display apparatus responsive to receipt of the gesture data and/or the determined location. The methodology 600 completes at 610.

With reference now to FIG. 7, an example methodology 700 that facilitates graphically displaying image data to a gloveless user on a touch sensitive display apparatus is illustrated. The methodology 700 starts at 702, and at 704 gesture data is received from the electromyography sensor unit that is in contact with the skin of a gloveless user. For example, the electromyography sensor unit may include one or more electromyography sensors and may in the form of one of a wearable wristband, forearm band, etc. Furthermore, as noted above, the gesture data received from the electromyography sensor can be indicative of a gesture of the gloveless user, wherein a gesture includes movement of at least one finger of the gloveless user and wherein the gesture data comprises data that identifies the at least one finger.

At 706, location of the gesture with respect to a touch sensitive display apparatus is determined. At 708, image data is graphically displayed to the gloveless user based at least in part upon the gesture data received at 704 and the location of the gesture determined at 706. The methodology 700 completes at 710.

Figure 8:
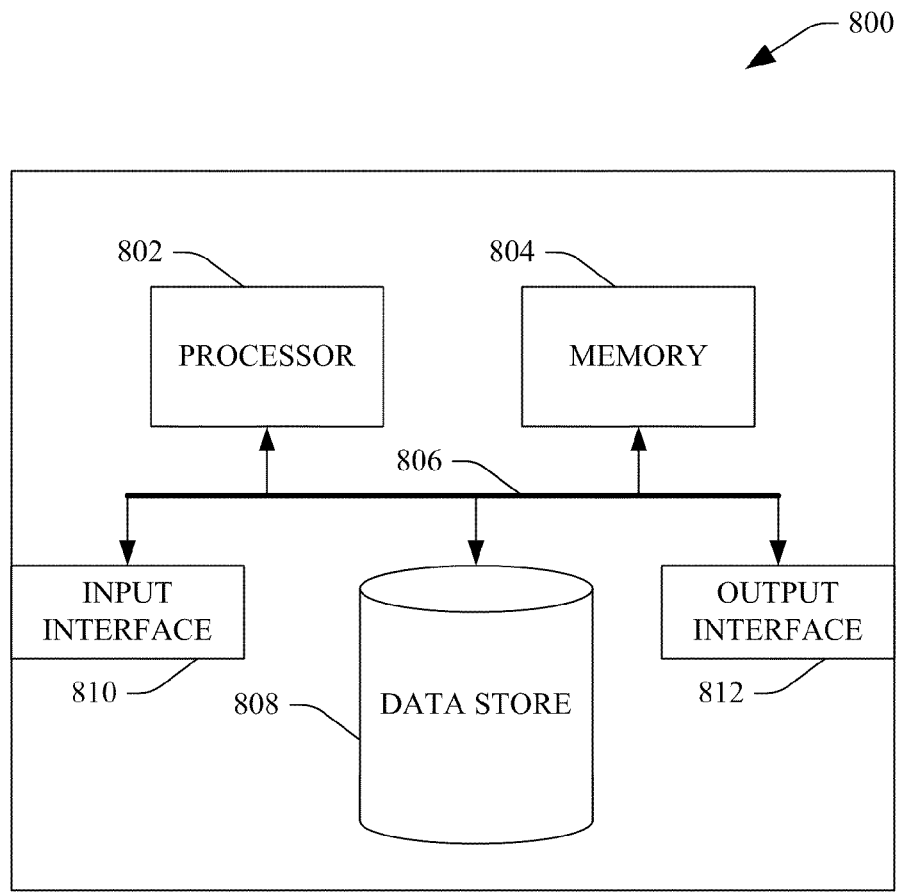
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports electromyography sensing. In another example, at least a portion of the computing device 800 may be used in a system that supports touch sensitive applications. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store calibration data pertaining to electromyography sensors, calibration data pertaining to touch sensitive display apparatuses, data identifying users, digits, etc.

The computing device 800 additionally includes a data store 808 that is accessible by the processor 802 by way of the system bus 806. The data store 808 may include executable instructions, image data displayed to a user on a touch sensitive display apparatus, etc. The computing device 800 also includes an input interface 810 that allows external devices to communicate with the computing device 800. For instance, the input interface 810 may be used to receive instructions from an external computer device, receive data from a sensor unit such as an electromyography sensor unit, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving gesture data from an electromyography sensor unit that is in contact with skin of a gloveless user, wherein the electromyography sensor unit is embodied as one of a wristband, a band for placement on a forearm, a device for coupling to a human shoulder, or a necklace, wherein the gesture data is indicative of a gesture performed by the gloveless user, the gesture comprising movement of a first finger on a first hand of the gloveless user relative to a second finger on the first hand, and wherein the gesture data comprises data that identifies the first finger, data that identifies the second finger, and data that identifies the first hand;
   determining location of the gesture with respect to a touch-sensitive display apparatus; and
   performing a computing process at the touch-sensitive display apparatus based at least in part upon the received gesture data and the determined location of the gesture with respect to the touch-sensitive display apparatus, wherein the computing process is performed based at least in part upon the data that identifies the first finger, the data that identifies the second finger, and the data that identifies the first hand.

2. The method of claim 1, wherein the determined location of the gesture is in a hoverspace of the touch-sensitive display apparatus.

3. The method of claim 1, wherein the gesture data further comprises data that is indicative of an identity of the gloveless user, and wherein the computing process is performed based at least in part upon the data that is indicative of the identity of the gloveless user.

4. The method of claim 1, wherein the gesture comprises touching the touch-sensitive display apparatus with the first finger, wherein the gesture data comprises data that is indicative of an amount of pressure applied to the touch-sensitive display apparatus by the first finger of the gloveless user, and wherein the computing process is performed based at least in part upon the data that is indicative of the amount of pressure applied to the touch-sensitive display apparatus by the first finger.

5. The method of claim 4, wherein the gesture comprises touching the touch-sensitive display apparatus with the second finger, wherein the gesture data comprises data that is indicative of an amount of pressure applied to the touch-sensitive display apparatus by the second finger of the gloveless user, and wherein the computing process is performed based at least in part upon the data that is indicative of the amount of pressure applied to the touch-sensitive display apparatus by the second finger.

6. The method of claim 1, further comprising calibrating the touch-sensitive display apparatus based at least in part upon the received gesture data.

7. The method of claim 1, wherein the gesture comprises touching the touch-sensitive display apparatus with the first finger, and wherein determining the location of the gesture with respect to the touch-sensitive display apparatus comprises determining where on the touch-sensitive display apparatus that the first finger is in physical contact with the touch-sensitive display apparatus.

8. The method of claim 1, wherein determining location of the gesture with respect to the touch-sensitive display apparatus comprises:
   emitting non-visible light through a diffuse display surface of the touch-sensitive display apparatus;
   receiving reflected non-visible light, wherein the reflected light is at least a portion of emitted light that is reflected from the first finger of the gloveless user; and
   determining that the gesture is occurring in a hoverspace above the touch-sensitive display apparatus based at least in part upon the reflected non-visible light.

9. The method of claim 1, wherein the gesture data indicates that the first finger and the second finger of the gloveless user are simultaneously performing gestures with respect to the touch-sensitive display apparatus.

10. The method of claim 1, wherein the gesture data indicates that the gloveless user and a second user are simultaneously performing respective gestures with respect to the touch-sensitive display apparatus, wherein the gesture data comprises data that disambiguates between the gloveless user and the second user, and wherein performing the computing process is based at least in part upon disambiguation between the gloveless user and the second user.

11. The method of claim 1, wherein determining location of the gesture with respect to the touch-sensitive display apparatus comprises receiving image data from a camera that is external from the touch-sensitive display apparatus, wherein the image data comprises an image of at least a portion of the gloveless user with respect to the touch-sensitive display apparatus.

12. A system that comprises the following computer-executable components:
   a receiver component that receives gesture data from an electromyography sensor unit that is in contact with skin of a gloveless user, wherein the electromyography sensor unit is in a form of one of a wristband or a forearm band, wherein the gesture data is indicative of a bodily gesture of the gloveless user, wherein the bodily gesture comprises positioning of a first finger and a second finger relative to one another, and wherein the gesture data comprises data that identifies the first finger and data that identifies the second finger;
   a location determiner component that determines location of the bodily gesture with respect to a touch-sensitive display apparatus; and
   a display component that causes the touch-sensitive display apparatus to display an image based at least in part upon the received gesture data and the determined location of the bodily gesture with respect to the touch-sensitive display apparatus, wherein the display component disambiguates between the first finger and second finger based at least in part upon the data that identifies the first finger and the data that identifies the second finger and causes the touch-sensitive display apparatus to display the image based at least in part upon disambiguating between the first finger and the second finger.

13. The system of claim 12, wherein the touch-sensitive display apparatus comprises the receiver component, the location determiner component, and the display component.

14. The system of claim 12, wherein the location determiner component determines that a first bodily gesture occurs in a hover space of the touch-sensitive display apparatus and that a second bodily gesture occurs in contact with the touch-sensitive display apparatus, and wherein the display component causes the touch-sensitive display apparatus to display the image based at least in part upon the first bodily gesture occurring in the hover space and the second bodily gesture occurring in contact with the touch-sensitive display apparatus.

15. The system of claim 12, wherein the location determiner component is configured to determine the location of the bodily gesture in a hoverspace above the touch-sensitive display apparatus.

16. The system of claim 12, wherein the gesture data indicates that the gloveless user and a second user are simultaneously performing respective gestures with respect to the touch-sensitive display apparatus, wherein the gesture data comprises data that disambiguates between the gloveless user and the second user, and wherein the display component causes the touch-sensitive display apparatus to display the image based at least in part upon the data that disambiguates between the gloveless user and the second user.

17. The system of claim 12, wherein the location determiner component is configured to receive image data from a camera external from the touch-sensitive display apparatus, wherein the image data comprises an image of at least a portion of the gloveless user with respect to the touch-sensitive display apparatus.

18. The system of claim 12, wherein the gesture data further comprises data that is indicative of an identity of the gloveless user, and wherein the display component causes the touch-sensitive display apparatus to display the image based at least in part upon the data that is indicative of the identity of the gloveless user.

19. The system of claim 12, further comprising a calibration component configured to calibrate the touch-sensitive display apparatus based at least in part upon the received gesture data.

20. A computer readable data storage device comprising instructions that, when executed by a processor, cause the processor to perform acts comprising:
  receiving gesture data from an electromyography sensor unit that is in contact with skin of a gloveless user, wherein the electromyography sensor unit is in a form of one of a wristband or a forearm band, wherein the gesture data is indicative of a gesture of the gloveless user, the gesture being positioning of a first digit of the gloveless user relative to a second digit of the gloveless user, and wherein the gesture data comprises data that identifies the first digit and data that identifies the second digit;
  determining a location of the gesture with respect to a touch-sensitive display apparatus; and
  graphically displaying image data to the gloveless user based at least in part upon the received gesture data and the determined location of the gesture with respect to the touch-sensitive display apparatus such that graphically displaying the image data to the gloveless user is based at least in part upon the data that identifies the first digit and the data that identifies the second digit.

\* \* \* \* \*